United States Patent [19]

Nagano et al.

[11] Patent Number: 5,249,211
[45] Date of Patent: Sep. 28, 1993

[54] FUEL ASSEMBLY

[75] Inventors: Mamoru Nagano; Hisao Nogiwa, both of Yokohama, Japan

[73] Assignee: Kabushiki Kaisha Toshiba, Kawasaki, Japan

[21] Appl. No.: 859,862

[22] Filed: Mar. 30, 1992

[30] Foreign Application Priority Data

Mar. 30, 1991 [JP] Japan .................. 3-067374

[51] Int. Cl.⁵ .............................. G21C 3/328
[52] U.S. Cl. .................................. 376/435
[58] Field of Search ............ 376/435, 428, 419

[56] References Cited

U.S. PATENT DOCUMENTS

| | | | |
|---|---|---|---|
| 4,587,090 | 5/1986 | Mochida et al. | 376/435 |
| 4,986,958 | 1/1991 | Haikawa | 376/435 |
| 5,008,070 | 4/1991 | Aoyama et al. | 376/428 |

FOREIGN PATENT DOCUMENTS

2-1589 1/1990 Japan .

*Primary Examiner*—Daniel D. Wasil
*Attorney, Agent, or Firm*—Oblon, Spivak, McClelland, Maier & Neustadt

[57] ABSTRACT

A fuel assembly to be charged in a reactor core comprises a channel box extending vertically in the core and having a substantially square cross section, a number of fuel rods arranged in the channel box in the form of a lattice in cross sections thereof, the fuel rods extending vertically in the channel box with spaces between each other, a plurality of spacers for supporting the fuel rods in the channel box so as to maintain axial spaces between the fuel rods and upper and lower tie plates for supporting upper and lower end portions of the fuel rods. The fuel rods include first type fuel rods arranged at and near four corner portions of the channel box, each of the first type fuel rods being composed of upper and lower areas, except for extreme upper and lower ends, in which a fuel enrichment of the upper area is made lower than that of the lower area. Furthermore, the fuel rods further include other type fuel rods being arranged at portions other than the first type fuel rods and including second type fuel rods, each of said second type fuel rods being composed of upper and lower areas, except for extreme upper and lower ends, in which a fuel enrichment of the upper area is made higher than that of the lower area. The boundary portions between the first and second type fuel rods are disposed in substantially the same level or different levels.

15 Claims, 11 Drawing Sheets

| 1.22 | 1.19 | 1.29 | 1.21 | 1.26 | 1.30 | 1.20 | 1.22 |
|---|---|---|---|---|---|---|---|
| 1.19 | 0.29 | 0.97 | 0.29 | 1.02 | 0.97 | 0.29 | 1.20 |
| 1.29 | 0.97 | 0.97 | 1.08 | 1.08 | 0.28 | 0.97 | 1.30 |
| 1.21 | 0.29 | 1.08 | | | 1.08 | 1.02 | 1.26 |
| 1.26 | 1.02 | 1.08 | | | 1.08 | 0.29 | 1.21 |
| 1.30 | 0.97 | 0.28 | 1.08 | 1.08 | 0.97 | 0.97 | 1.29 |
| 1.20 | 0.29 | 0.97 | 1.02 | 0.29 | 0.97 | 0.29 | 1.19 |
| 1.22 | 1.20 | 1.30 | 1.26 | 1.21 | 1.29 | 1.19 | 1.22 |

FIG 2A

| 1.35 | 1.26 | 1.27 | 1.20 | 1.25 | 1.28 | 1.26 | 1.35 |
|---|---|---|---|---|---|---|---|
| 1.26 | 0.29 | 0.92 | 0.29 | 0.97 | 0.91 | 0.29 | 1.26 |
| 1.27 | 0.92 | 0.97 | 1.08 | 1.07 | 0.28 | 0.91 | 1.28 |
| 1.20 | 0.29 | 1.08 | | | 1.07 | 0.97 | 1.25 |
| 1.25 | 0.97 | 1.07 | | | 1.07 | 0.29 | 1.20 |
| 1.28 | 0.91 | 0.28 | 1.07 | 1.07 | 0.97 | 0.92 | 1.27 |
| 1.26 | 0.29 | 0.91 | 0.97 | 0.29 | 0.92 | 0.29 | 1.25 |
| 1.35 | 1.26 | 1.28 | 1.25 | 1.20 | 1.27 | 1.26 | 1.35 |

FUEL ASSEMBLY

BACKGROUND OF THE INVENTION

The present invention relates to fuel assemblies to be charged into a reactor core of a nuclear power plant, particularly a boiling water type reactor, for achieving an improved safeness at a reactivity initiated accident, an improved good running performance and fuel economy advantages.

Figure 12:
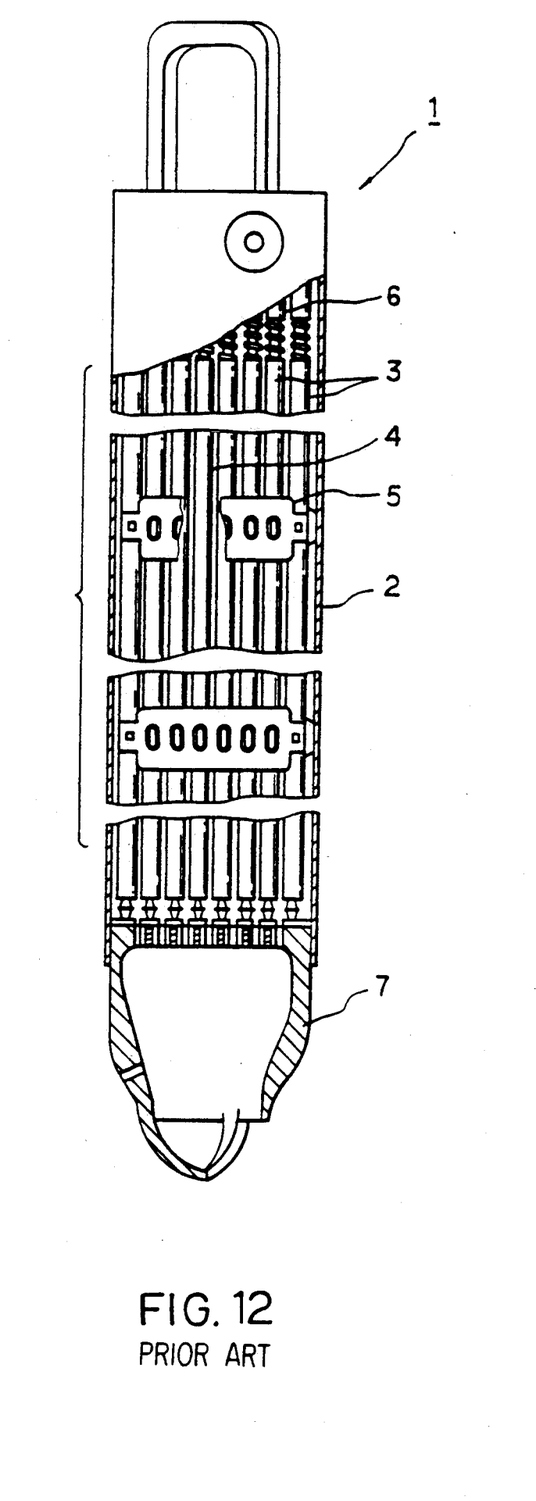
FIG. 12 shows an elevational section showing a general structure of a fuel assembly.

A typical example of a fuel assembly to be charged into a boiling water type reactor is shown in FIG. 12 in an elevational section. Referring to FIG. 12, a fuel assembly is generally denoted by reference numeral 1 and the fuel assembly 1 comprises a square cylindrical channel box 2 in which a plurality of fuel rods 3 containing fuel material and at least one water rod 4 acting as a neutron moderator are accommodated. These fuel rods 3 and the water rod 4 are arranged, in the form of a lattice of 8 rows and 8 columns, vertically along the axial direction of the channel box 2 and spaced with each other by axially predetermined distances by spacers 5. The fuel rods 3 and the water rod 4 are supported at their upper and lower ends by upper and lower tie plates 6 and 7, respectively.

The reactor includes a core which is constituted by a plurality of fuel assemblies 1 each of the structure described above. In the fuel assembly 1, a highly pressurized water acting as a neutron moderator and a coolant flows into the fuel assembly from the lower portion thereof and circulates therein. During the circulation, the highly pressurized water is heated and boiled, thereby generating a void. For such phenomenon, there is provided a void distribution in which a void factor is made small at the lower portion in the fuel assembly 1 and large at the upper portion thereof.

Another highly pressurized water, not boiled, flows in a gap between adjoining two fuel assemblies 1 in the core. Accordingly, there exists a difference in densities of highly pressurized waters flowing inside and outside the fuel assembly 1 in the axial and diametrical directions. However, it is known that the higher neutron moderating effect is achieved at a water area having high density and hence, at such area, thermal neutron flux causing a nuclear fussion is high and a high power is generated, resulting in non-uniform reactor power distribution. In order to obviate such phenomenon, in the boiling water reactor, fuel enrichment distribution and burnable poison concentration distribution are made different in the axial and diametrical directions in the fuel assembly 1 to obtain a flat power distribution.

Figure 13A:
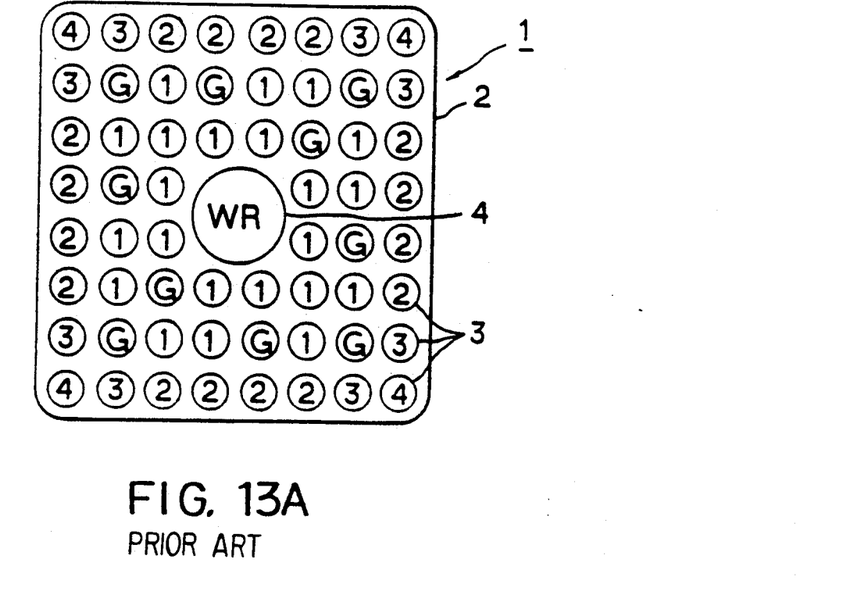
FIGS. 13A and 13B are views similar to FIGS. 1A and 1B, corresponding to the fuel assembly of conventional arrangement.
Figure 13B:
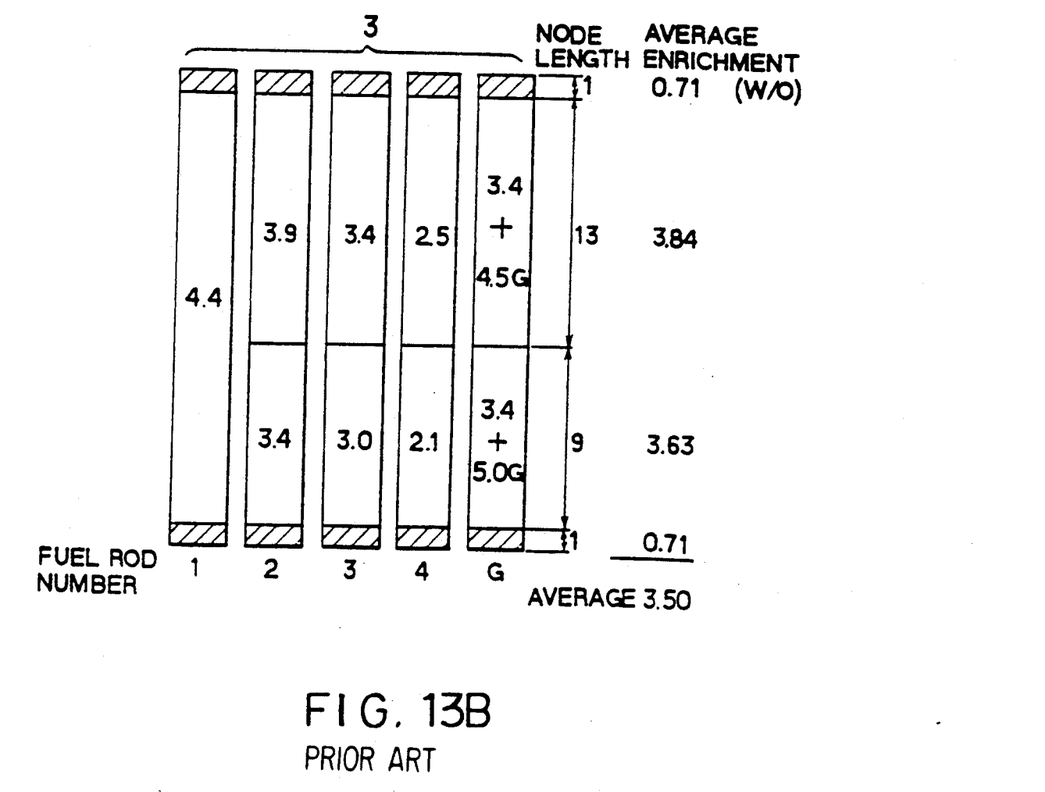

In view of these facts, one example of a fuel assembly 1 provided with the fuel enrichment distribution and the burnable poison concentration distribution is shown in FIGS. 13A and 13B.

As shown in FIG. 13A, the fuel assembly 1 is composed of the fuel rods 3 arranged in a square lattice of 8 rows and 8 columns in cross section, and one water rod 4 arranged centrally in this lattice arrangement. The water rod 4 generally has a cross sectional area larger than that of the fuel rod 3. FIG. 13B shows the distribution of the enrichments of the respective fuel rods 3 and the distribution of gadolinium as burnable poison. In FIG. 13, reference numeral 1, 2, 3 and 4 are added to the respective fuel rods 3 as the different type fuel rods and these fuel rods are composed as uranium fuel rods. G represents the fuel rods containing the burnable poison including gadlinium, for example. The numerals shown in the fuel rods 3 of FIG. 13B represent the enrichments of the uranium 235 (weight %: w/o), and the numerals such as 5.0 G denotes the containing amount of the gadlinium being of 5.0 w/o.

In the example of the fuel assembly 1 of FIGS. 13A and 13B, the distribution of the enrichment of the fuel assembly 1 is divided into two portions, in which the enrichment in the axially upper area or region is made higher than that of the lower portion to make flat the power distribution of the core. That is, in FIG. 13A, the fuel rods numbered with 2, 3, and 4 are designed so as to have the enrichment distributions, whereby the entire enrichment distribution of the fuel rods 3 is made high in the upper portion of the fuel assembly 1.

Further, as shown in FIG. 13A, the fuel assembly 1 is designed so that the fuel rods 3 facing the channel box 2 and arranged near the corner portions of the channel box 2 have relatively low enrichment distributions to thereby make flat the power distribution in the diametrical direction of the fuel assembly 1.

At the arrangement of the fuel rods 3 having the enrichment distributions in the fuel assembly 1, significant weight is given to the fuel rods 3 arranged on the outer peripheral sides facing the sides of the channel box 2. This is because the fuel rods 3 arranged on the outer pheripheral sides have high neutron flux since the water passing outside the channel box 2 is not boiled.

For the reason described above, when the fuel rods 3 having the enrichment distributions are arranged at the outer peripheral portion of the channel box 2, the high power is generated by the peripherally arranged fuel rods 3 because of the high thermal neutron flux in comparison with the centrally arranged fuel rods 3. There is known a local power peaking factor as barometer of the power generation of the fuel rods 3 in the fuel assembly 1. The local power peaking factor represents a relative ratio of the power of each of the fuel rods 3 with respect to the average power of the entire fuel assembly 1 in the diametrical direction. Since the maximum value of this local power peaking factor is limited by a limited value of the maximum linear power density allowable to the fuel rod 3, there is a limit to the increase of the enrichment of the peripherally arranged fuel rods 3.

In the meantime, when the enrichment of the fuel rods arranged in the high thermal neutron flux area is increased, an infinite multiplication factor increases in comparison with a case where the enrichment is increased by the same amount as in the low thermal neutron flux area. For this reason, to relatively increase the enrichment of the peripherally arranged fuel rods as much as possible results in the increasing of the infinite multiplication factor, resulting in the fuel economy.

Therefore, it is optimally desired to design the fuel assembly so as to satisfy, as much as possible, the limit of the local power peaking factor and the increasing of the infinite multiplication factor though both are contrary to each other. In order to achieve this desire, in the fuel assembly of conventional design, the average enrichment of the fuel rods arranged at the peripheral portions facing the sides of the channel box 3 is made high at the upper area of the fuel assembly in comparison with the lower area. In such design, the peripherally arranged fuel rods provide a relatively large local power peaking factor.

The fuel assembly 1 thus designed inherently involves a problem such that the local power peaking factor in the reactor low temperature operation may further exceed in comparison with that in the reactor power operation period. This is based on the fact that, at the reactor low temperature operation period, neutron absorption effect of the burnable posion contained in the centrally arranged fuel rod G, and hence the power at the central portion of the fuel assembly, is lowered, that is, the power of the peripherally arranged fuel rods is increased. The local power peaking factor at the low temperature operation period is an important parameter in a viewpoint of retention fuel enthalpy in a reactivity initiated accident.

The reactivity initiated accident is an event which is caused, for example, at a time when a reactivity worth of a control rod is made high at a low temperature operation period such as a reactor operation starting period and such a high reactivity as may erroneously cause a prompt criticality is applied to the reactor. In such an event, the retention fuel enthalpy of the fuel rod 3 rapidly raises and hence results in the breakage of the fuel rod 3. Further, at a time when the fuel enthalpy exceeds its limit value of 230 cal/g $UO_2$, a mechanical energy such as pressure wave is caused. Furthermore, at the low temperature operation period of the reactor, since no void is generated, the axial power distribution in the reactor is distored extremely towards the upward direction thereof. For this reason, the magnitude of the local power peaking factor in the upper area of the fuel assembly 1 in the low temperature operation period is a matter of importance in a viewpoint of the fuel enthalpy at the reactivity initiated accident.

The local power peaking factor in the low temperature operation period of the conventional fuel assembly 1 is suppressed in a range in which a high fuel enthalpy resulting in the generation of the pressure wave is not caused.

However, in the future, in order to improve the fuel economy of the nuclear power plant, there is a fear that the local power peaking factor is made further high at the low temperature operation period in view of the improvement of the burning efficiency of the nuclear fuel, which is inconvenient. However, in such a case, since it should be inhibited that the local power peaking factor exceeds the maximum value of the fuel enthalpy allowed at the reactivity initiated accident, the local power peaking factor in the low temperature operation period is itself limited. As a result, this fact constitutes a significant problem for the design of the fuel assembly, which may result in a problem of not increasing the enrichment of the fuel assembly.

In the design of the conventional fuel assembly, it is desired in the economical viewpoint to increase the enrichment of the fuel rods arranged on the peripheral side in the channel box. However, this design of the fuel assembly increases the local power peaking factor as described above, and this increasing is remakable at the low temperature operation period of the reactor. This increasing is also significantly related to the increasing of the fuel enthalpy at the generation of the reactivity initiated accident, thus being inconvenient and troublesome.

SUMMARY OF THE INVENTION

An object of the present invention is to substantially eliminate defects and drawbacks encountered in the prior art described above and to provide a fuel assembly to be charged in a reactor core capable of preventing an increasing of a local power peaking factor in a low temperature operation period of the reactor to thereby prevent an increasing of a fuel enthalpy in a reactivity initiated accident.

Another object of the present invention is to provide a fuel assembly capable of achieving an improved fuel economy and an improved power distribution of the reactor.

These and other objects can be achieved according to the present invention, in one aspect, by providing a fuel assembly to be charged in a reactor core comprising:

a channel box extending vertically in the core and having a substantially square cross section;

a number of fuel rods arranged in the channel box in the form of a lattice in cross sections thereof, the fuel rods extending vertically in the channel box with spaces with each other;

a plurality of spacers for supporting the fuel rods in the channel box so as to maintain axial spaces between the fuel rods; and upper and lower tie plates for supporting upper and lower end portions of the fuel rods;

wherein the fuel rods include first type fuel rods arranged at and near four corner portions of the channel box, each of the first type fuel rods being composed of upper and lower areas, except for extreme upper and lower ends, in which a fuel enrichment of the upper area is made lower than that of the lower area.

In another aspect, there is also provided a fuel assembly to be charged in a reactor core comprising:

a channel box extending vertically in the core and having a substantially square cross section;

a number of fuel rods arranged in the channel box in the form of a lattice in cross sections thereof, the fuel rods extending vertically in the channel box with spaces between each other;

a plurality of spacers for supporting the fuel rods in the channel box so as to maintain axial spaces between the fuel rods; and upper and lower tie plates for supporting upper and lower end portions of the fuel rods;

wherein the fuel rods include first type fuel rods arranged at and near four corner portions of the channel box, each of the first type fuel rods being composed of upper and lower areas, except for extreme upper and lower ends, in which a fuel enrichment of the upper area is made lower than that of the lower area and also include other type fuel rods being arranged at portions other than the portions of the first type fuel rods and including second type fuel rods, each of the second type fuel rods being composed of upper and lower areas, except for extreme upper and lower ends, in which a fuel enrichment of the upper area is made higher than that of the lower area.

In preferred embodiments, the upper and lower areas of the first and second type fuel rods are divided by first and second boundary portions, respectively, the first and second boundary portions being positioned at substantially the same level with each other so as to design the upper areas of the fuel assembly having an average fuel enrichment larger than that of the lower areas thereof. The upper and lower areas of the first and second type fuel rods may be divided by first and second boundary portions, respectively, the first boundary portions of the first type fuel rods being positioned at levels higher than the second boundary portions of the second type fuel rods so that the fuel assembly is axially divided into upper, intermediate and lower areas, wherein average fuel enrichments in the upper and lower area are made higher than an average fuel enrichment of the intermediate area. The second type fuel rods including fuel rods each containing a burnable poison such as gadolinium.

The fuel rods further include third type fuel rods each having an axially equal fuel enrichment distribution.

The fuel rods further includes fourth type fuel rods each having an axial section divided into upper, intermediate and lower areas, in which the fuel enrichments in the upper and lower areas are made lower than that of the intermediate area.

The fuel rods further include fifth type fuel rods each having an axial length shorter than those of other type fuel rods. The fifth type fuel rods has an axially upper portion cut off by a length of about one third of a fuel effective length. The fifth type fuel rods are arranged between the first type fuel rods and the centrally arranged water rods in the lattice arrangement.

According to the fuel assemblies of the characters described above, in one preferred aspect, the first type fuel rods arranged at and near the four corner portions of the channel box are each composed of an axially upper area and a lower area, except for the extreme upper and lower ends, in which the fuel enrichment of the upper area is made lower than that of the lower area. Accordingly, at the low temperature operation period of the reactor such as reactor running start time, when the axial power distribution is extremely upwardly warped, the local power peaking factor at the upper area of the fuel assembly can be made small in comparison with that of the conventional fuel assembly.

As described, the first type fuel rods have the function such that the local power peaking factor at the upper area of the fuel assembly at the reactor low temperature operation period can be reduced and the infinite multiplication factor at the lower area in the reactor power operation period can be increased. Accordingly, the increasing of the fuel enthalpy at the reactivity initiated accident at the low temperature operation period can be effectively prevented.

In another preferred aspect, the second type fuel rods are arranged in addition to the first type fuel rods, and the second type fuel rod includes the axially upper and lower ares, in which the fuel enrichment of the upper area is made higher than that of the lower area. Therefore, the increasing of the average fuel enrichment of the fuel assembly by the arrangement of the first type fuel rods can be prevented by the arrangement of the second type fuel rods, thereby making flat the axial power distribution of the reactor.

The above advantage can be facilitated by attempting the evenness of the axial fuel enrichment of the fuel assembly and properly making different the boundary positions between the upper and lower areas in the first and second type fuel rods, whereby the axial power distribution can be made further flat, resulting in the fuel economy.

Namely, in the design in which the boundary portions of the first and second type fuel rods are positioned in substantially the same level, the axial fuel enrichment distribution of the fuel assembly is divided into upper and lower two areas. In this design, when the fuel enrichment distributions of the first and second type fuel rods are regulated so that the upper one is made higher than the lower one, the downward distortion tendency of the axial power distribution at the reactor power operation period due to the presence of the axial void distribution can be amended, thereby realizing the flat power distribution.

Furthermore, when the boundary portion of the first type fuel rod is disposed at an axial level higher than that of the second type fuel rod, the axial fuel enrichment distribution of the fuel assembly is divided into three areas. In this arrangement, by regulating the fuel enrichments of the first and second type fuel rods so that the average fuel enrichments in the upper and lower areas are made lower than the average fuel enrichment of the intermediate area, the power distribution of the reactor at the power operation period can be made substantially flat and the fuel economy can be effectively improved. The improvement of the fuel economy can be generally achieved in a viewpoint of the fuel assembly design in which the fuel enrichment of the upper area is made low. In the core upper portion, the neutron largely leaks to the outside of the core because of much void amount, and accordingly, the neutron leakage can be suppressed by the extent corresponding to the lowering amount of the fuel enrichment.

BRIEF DESCRIPTION OF THE DRAWINGS

For a better understanding of the present invention and to show how the same is carried out, reference is made, by way of preferred embodiments, to the accompanying drawings; in which.

DESCRIPTION OF THE PREFERRED EMBODIMENTS

The fuel assembly according to the present invention is a fuel assmbly to be charged into a core of a boiling water reactor and has a general structure substantially identical to that shown in FIG. 12, and accordingly, the detailed explanation thereof is omitted herein.

Figure 1A:
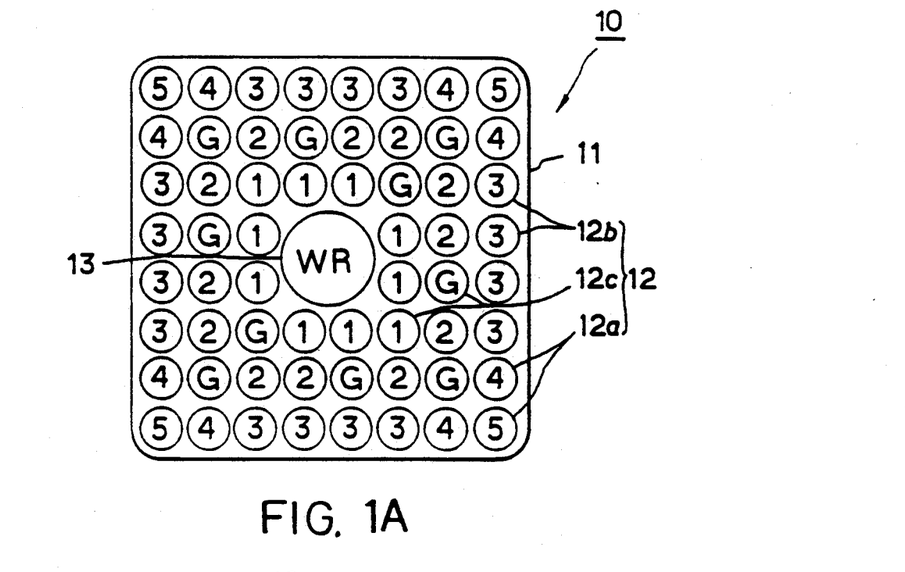
FIG. 1A shows an arrangement of fuel rods in a fuel assembly according to the first embodiment of the present invention.
Figure 1B:
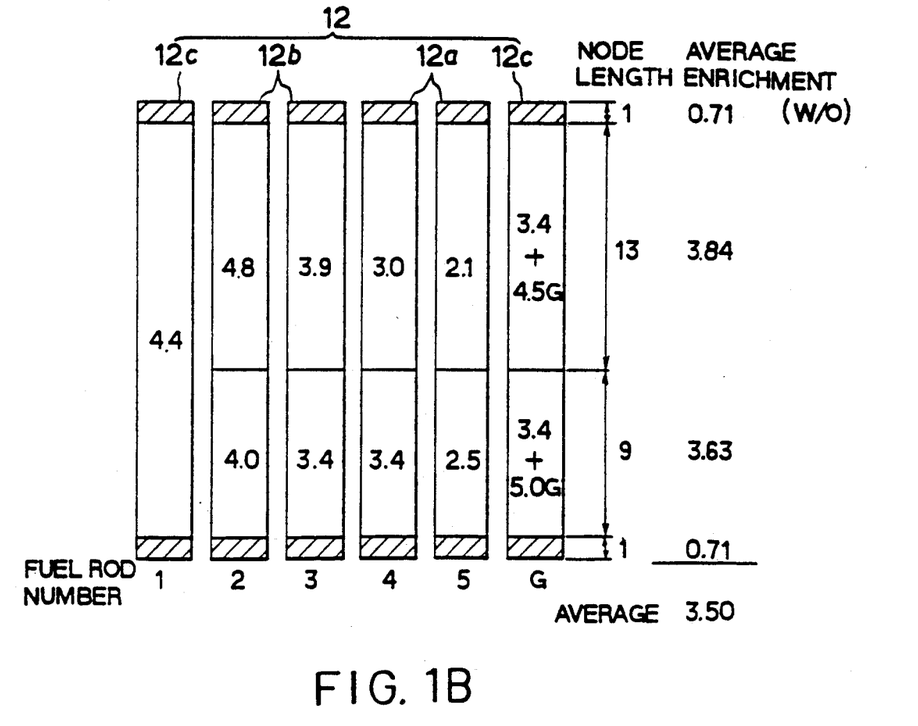
FIG. 1B shows a graph representing a fuel enrichment and a burnable poison concentration distribution of the fuel rods of the fuel assembly of the first embodiment.

FIGS. 1A and 1B are views, similar to those of FIGS. 13A and 131B, representing a first embodiment of the fuel assembly according to the present invention.

Referring to FIG. 1A, a fuel assembly 10 is provided with a cylindrical channel box 11 substantially square in cross section, i.e. diametrical section of the fuel assembly. In the channel box 11, there are arranged a number of fuel rods 12 in the form of square lattice of 8 rows and 8 columns including one central water rod 13 having a diameter larger than that of the fuel rods 12. Each of the fuel rods 12 is composed of an outer clad tube in which a fuel material in the form of pellet is packed or charged, and the axial effective length of the fuel rod 12, that is, the axial length of a portion in which the nuclear fuel is packed, is divided into 24 nodes, for example, the length usually being of 144 to 146 inches which is substantially equal to the core effective height of the reactor core.

A plurality of kinds of fuel rods 12a to 12c having differences in their fuel enrichments are arranged in the channel box 11 as fuel rods 12, and the distributions of the enrichments of the respective fuel rods 12 are shown in FIG. 1B, in which the fuel rods 12 are classified into first, second and third fuel rods 12a, 12b and 12c in accordance with the distribution of the enrichments.

Referring to FIG. 1B, the first fuel rods 12a each has the enrichment distribution in which the enrichment of the upper area is lower than that of the lower area except for the extreme upper and lower end portions, such fuel rods 12a being designated by fuel rod numbers 4 and 5. The second fuel rods 12b each has the enrichment distribution in which the enrichment of the upper area is higher than that of the the lower area except for the extreme upper and lower end portions, such fuel rods 12b being designated by fuel rod numbers 2 and 3. The third fuel rods 12c each has a uniform enrichment distribution throughout the entire axial length thereof except for the extreme upper and lower end portions, such fuel rods 12c beind denoted by the fuel rod number 1 and G.

The boundary of the upper area and the lower area of the second fuel rod 12a exists in a range of 7/24 to 16/24 length of the entire axial length of the effective length of the fuel assmbly 10 apart from the lower end portion of the effective length, and the boundary of the upper and lower areas of the first fuel rod 12a also exists in the same range as that of the second fuel rod 12b.

All the fuel rods 12 have upper and lower end portions or areas, each having a length of 6 to 12 inches, into which natural uranium (U-235 of 0.71 w/o) is packed, these areas being called blanket portions or areas, which are considered separately from the central enrichment portion. In general, the blanket area has an axial length of about 6 to 12 inches which corresponds to one node at both the upper and lower end portions of each of the fuel rods 12, and accordingly, the branket areas are omitted hereinlater for the explanation of the axial enrichment distribution.

In the embodiment of the fuel assembly 10 such as shown in FIG. 1, the boundaries between the upper and lower areas of the first and second kinds of fuel rods 12a and 12b are positioned on the same levels, so that the axial average distribution of the enrichment of the fuel assembly 10 will be divided into upper and lower areas or sections. In the embodiment of the fuel assembly 10, the average enrichment of the upper area is 3.84 w/o, which is larger than the average enrichment of 3.63 w/o at the lower area. In FIG. 1B, the enrichments of the fuels packed in the respective fuel rods 12 are represented with weight percent (w/o), and the axial average distribution of the fuel enrichment of the fuel assembly 10 is substantially equal to that of a fuel assembly 1 of the conventional design such as shown in FIG. 13.

Figure 2A:
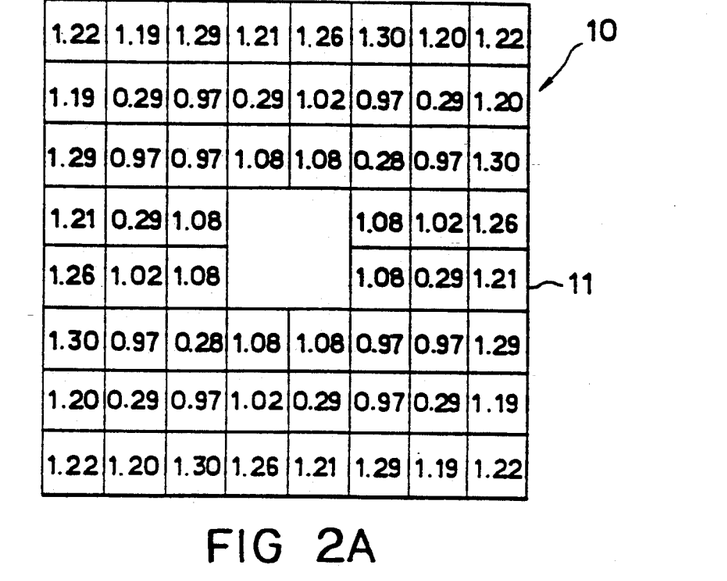
FIGS. 2A and 2B are views showing local power peaking factors at the low temperature operation period of the fuel assembly of the first embodiment and a fuel assembly of conventional arrangement.
Figure 2B:
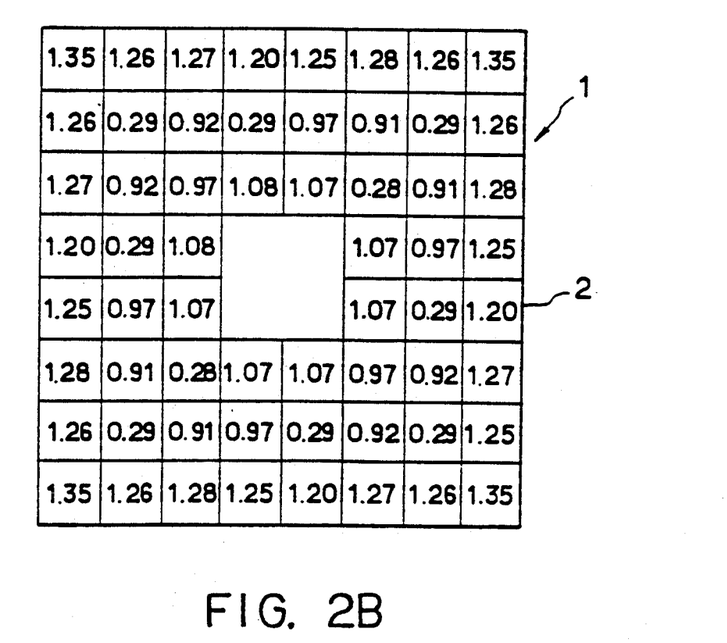

FIG. 2A shows a distribution of the local power peaking factors, at the low temperature operation period scuh as a reactor operation start time, at the upper area of the fuel assembly 10 in the fuel rod arrangement in which the fuel rods 12a of the numbers 3 and 4 are arranged at the four corner portions of the channel box 11 of the fuel assembly 10. FIG. 2B also shows a distribution of the local power peaking factors at the low temperature operation period of the reactor of the fuel assembly of the conventional arrangement of FIG. 13.

In the fuel assembly 1 of the conventional arrangement, the maximum value of the local power peaking factor is 1.35 and this peaking is caused to the fuel rods arranged at the four corner portions of the channel box 2 of the fuel assembly 1. On the contrary, according to the fuel assembly 10 of the present embodiment, the local power peaking factor of the fuel rods arranged at the four corner portions is reduced to 1.22 in comparison with the conventional one, and the maximum value of 1.30 of the peaking factor is caused to another fuel rod. According to such arrangement in which the first fuel rods 12a are arranged at the four corner portions of the channel box 11, the maximum value of the local power peaking factor can be reduced by about 4%.

Figure 3:
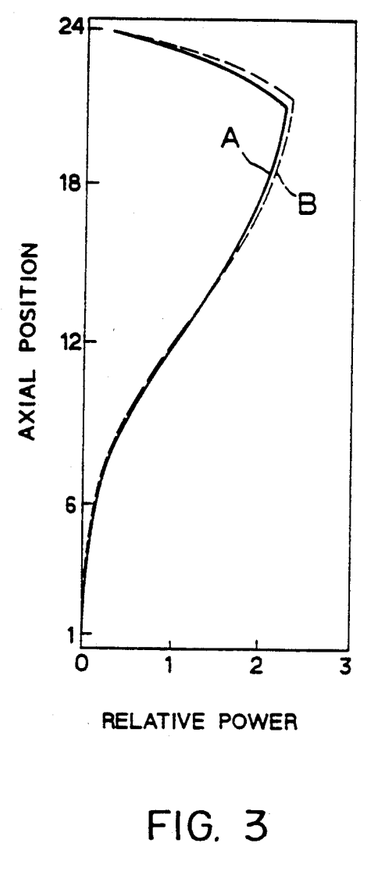
FIG. 3 is a graph showing the axial power distribution at the low temperature operation period of a core of the first embodiment in comparison with that of the conventional example.

FIG. 3 shows a graph in which the axial power distribution at the low temperature operation period of the reactor charged with the fuel assemblies 10 is represented by a solid curve for the comparison with the conventional distribution which is shown by a broken line. As can be seen from the graph, since no void is generated in the channel box 11 at the low temperature operation period of the reactor, the axial power distribution is extremely warped upwardly. For this reason, the reactivity initiated accident occurs at the low temperature operation time, and when the reactor power rapidly increases, the retention fuel enthalpy increase of the fuel at the upper area of the fuel assembly is made remarkable.

In the evaluation of the maximum fuel enthalpy in the assumption of the control rod fall-down accident as one example of the reactivity initiated accident, the maximum value of the fuel enthalpy of the conventional fuel assembly is 223 cal/gUO$_2$, whereas that of the fuel assembly 10 of the present invention is 215 cal/gUO$_2$. Thus, it may be said that, according to the fuel assembly 10 of the present embodiment, the maximum value of the fuel enthalpy is also lowered in proportion to the reduction of the local power peaking factor as mentioned above. Since the maximum value, i.e. limited value, allowable in design, of the fuel enthalpy is 230 cal/gUO$_2$, the fuel assembly 10 of the present embodiment has an increased margin with respect to the limited value.

The infinite multiplication factor of the fuel assembly at the reactor power operation period will be described hereunder. In the fuel assembly 10 shown in FIG. 1, since the first fuel rods 12a are arranged at the four corner portions of the channel box 11, the infinite multiplication factor K ∞ is lowered by about 0.5% Δ K in comparison with the conventional fuel rod arrangement even if the average fuel enrichment at the upper area of the fuel assembly is made high to the same value as that of the conventional fuel assembly by locating the second fuel rods 12b numbered with 2.

In the meantime, at the lower area of the fuel assembly 10, the first fuel rods 12a are arranged at the peripheral portions near the four corner portions of the channel box 11, so that the infinite multiplication factor K ∞ is increased by about 4.6% Δ K in comparison with the arrangement of the conventional fuel assembly, and accordingly, as the whole fuel assembly, on average, the fuel assembly 10 has the infinite multiplication factor of the value substantially identical to that of the conventional fuel assembly. According to such arrangement of the first fuel rods 12a, the fuel economy is not damaged.

Figure 4:
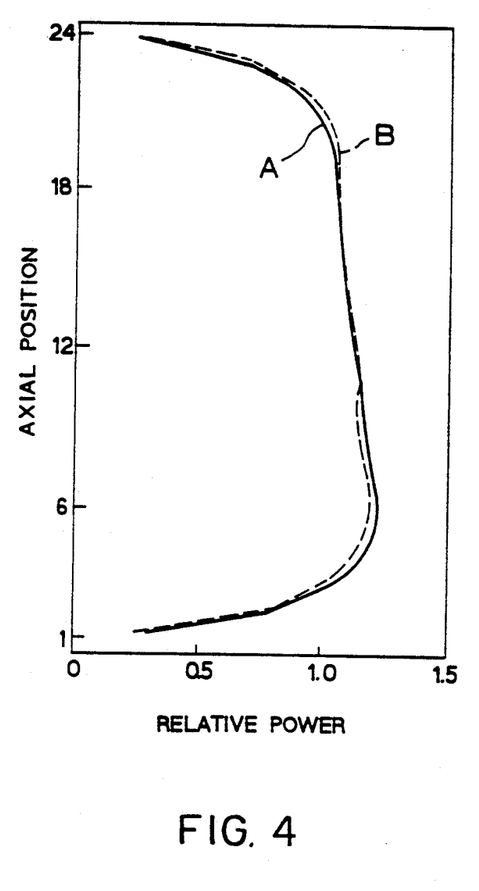
FIG. 4 is a graph showing the axial power distribution at the power operation period of the core of the first embodiment in comparison with that of the conventional example.

Furthermore, in the fuel assembly 10 shown in FIG. 1, the distribution of the axially average fuel enrichment is regulated by arranging the second fuel rods 12b to provide the distribution substantially identical to that of the conventional fuel assembly. Therefore, as shown in FIG. 4, the power distribution curve during the power operation period of the reactor is represented by the solid flat line A which is substantially identical to the broken line B of the conventional power distribution curve, thus achieving good reactor running performance.

Figure 5:
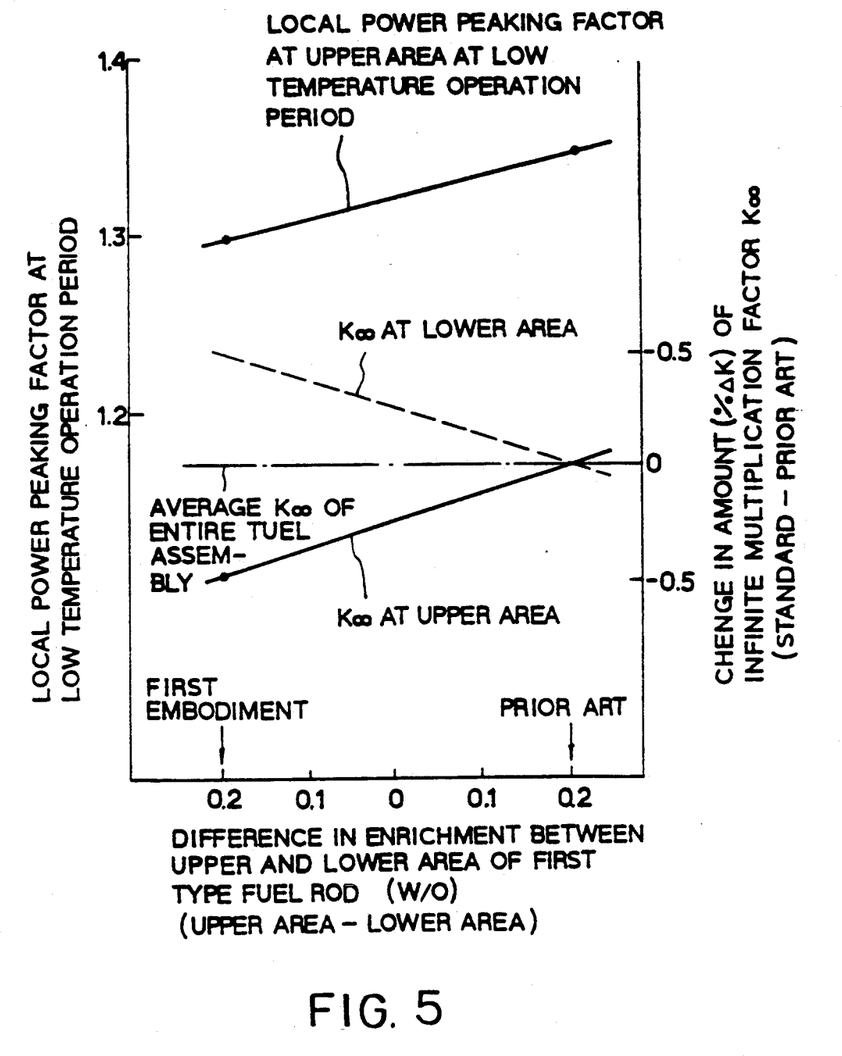
FIG. 5 is a graph showing relationships between the axial fuel enrichment difference of the first type fuel rods charged in the fuel assembly of the first embodiment, the local power peaking factor at the low temperature operation period at the upper area of the fuel assembly, and between the upper and lower areas of the fuel assembly and the average infinte multiplication factor.

FIG. 5 is a graph showing the relationship between the local power peaking factor at the low temperature operation period, the infinite multiplication factors K ∞ at the power operation period at the upper and lower areas, and the average infinite multiplication factor K ∞ of the entire fuel assembly, with the average fuel enrichment difference between the upper and lower area of the fuel assembly being a parameter. In the evaluation, the average fuel enrichment at the upper and lower areas of the first fuel rods 12a is maintained constant, and the average fuel enrichment of the fuel assemblies 10 in the axial areas are regulated to be substantially equal to that of the conventional fuel assemblies by regulating the axial fuel enrichment distribution of the second fuel rods 12b.

As can be seen from FIG. 5, the local power peaking factor at the low temperature operation period of the reactor at the upper arear of the fuel assembly is made small by making smaller the enrichment of the upper areas of the first fuel rods 12a than that of the lower areas thereof. Furthermore, since the fuel rods are designed so that the enrichment of the lower areas of the first fuel rods 12a is increased, the average infinite multiplication factor K∞ of the entire fuel assemblies is hardly lowered.

The second embodiment of the fuel assembly according to the present invention will be described hereunder with reference to FIGS. 6 to 8, in which like reference numerals are added to portions or areas corresponding to those of the fuel assembly 10 shown in FIG. 1.

Figure 6:
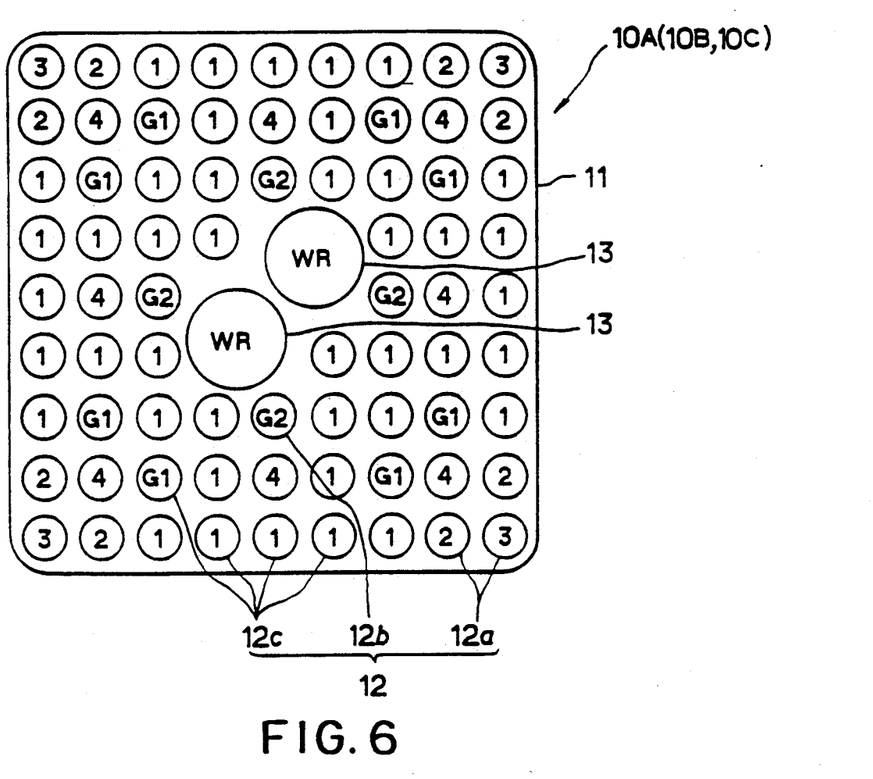
FIG. 6 is a view similar to that FIG. 1A, corresponding to the fuel assembly of the second embodiment of the present invention.
Figure 7:
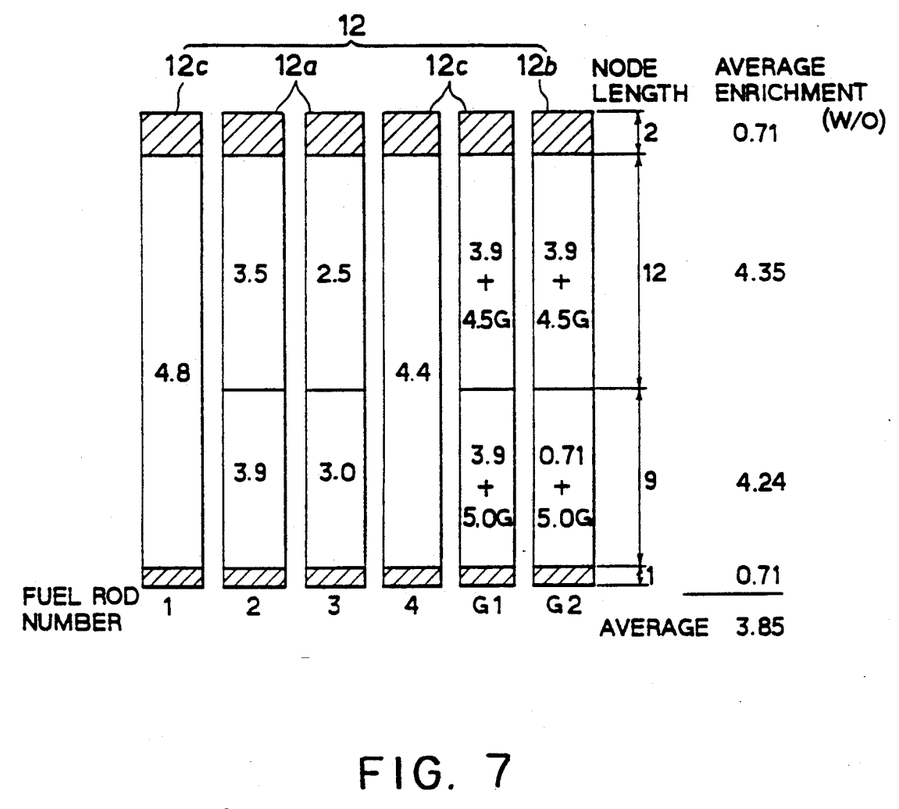
FIG. 7 is a view similar to FIG. 1B, corresponding to the second embodiment.

FIGS. 6 and 7 show one example of the fuel assembly 10A desinged for achieving a high burning performance of the reactor. Since such a reactor is designed so that the average fuel enrichment increases, mismatching in powers between the respective fuel assemblies increases. Accordingly, there is such tendency as that the maximum fuel enthalpy at an occurence of the reactivity initiated accident further increases, and therefore, the fuel assembly design has significant meaning and effect for achieving the high burning performance of the reactor.

The fuel assembly 10A is composed of a channel box 11 in which a number of fuel rods 12 are arranged in a square lattice of 9 rows and 9 columns including two water rods 13 having large cross sectional areas corresponding to the cross sectional areas of seven fuel rods 12, the water rods 13 being arranged centrally of the lattice arrangement. The total number of the fuel rods 12 is increased by about 20% in number in comparison with that of the conventional fuel assembly such as shown in FIG. 13. According to such design, the thermal load per one fuel rod 12 can be reduced, whereby the lowering of the thermal margine due to the high burning requirement is prevented.

FIG. 7 shows the axial fuel enrichment distribution and the gadlinium concentration distribution of the respective fuel rods 12 of the fuel assembly 10A. The average fuel enrichment of the fuel assembly 10A is about 3.9 w/o. The fuel rod numbers 2 and 3 represent the first fuel rods 12a, the fuel rod number G2 represents the second fuel rods 12b and the remaining fuel rods represent the third fuel rods 12c. In this arrangement, the axial fuel enrichment distribution is designed to be uniformly equal. Twelve first fuel rods 12a are arranged near the four corner portions of the channel box as in the fuel assembly 10 of the first embodiment, and four second fuel rods 12b include the gadlinium, being the natural uranium, each having an upper area of the fuel enrichment of about 3.9 w/o and a lower area of the fuel enrichment of about 0.71 w/o.

The local power peaking factor at the low temperature operation period at the upper area of the fuel assembly 10A is made to 1.34 by the adaption of the first fuel rods 12a at the four corner portions of the channel box 11. In such arrangement, the fuel enthalpy at the reactivity initiated accident in the assumption of the control rod fall-down case is 226 cal/gUO$_2$, which satisfies the limited value, 230 cal/gUO$_2$, of the fuel enthalpy.

On the other hand, in a conventional fuel assembly in which the first fuel rod 12a is not arranged and the fuel enrichments of the first fuel rods 12a are made reverse at the upper and lower areas of the fuel rods, there is a possibility that the local power peaking factor at the low temperature operation period at the upper area of such fuel assembly increases up to a value of about 1.5. In such a case, the fuel enthalpy far exceeds its limited value, thus such a fuel assembly is not designed.

In the fuel assembly 10A of the second embodiment shown in FIGS. 6 and 7, the second fuel rods 12b include burnable poison such as gadlinium for the following two reasons.

First, the reason is for the improvement of the fuel economy due to the increasing of the infinite multiplication factor at the lower area of the fuel assembly 10. For the fuel assemblies of the same average fuel enrichment, the infinite multiplication factor can be made large by making high the enrichment of the fuel rods arranged at the peripheral portion of the channel box of the fuel assembly. The fuel rods including the burnable poison such as gadlinium are arranged at the central portion of the fuel assembly, and accordingly, the infinite multiplication factor can be made large even in the same average fuel enrichment by arranging the second fuel rods 12b at the central portion of the fuel assembly 10 as compared with the conventional fuel assembly of FIG. 13 or the fuel assembly of the first embodiment shown in FIG. 1.

Secondly, the increasing of the local power peaking factor at the lower area at the power operation period can be prevented by lowering the fuel enrichment in the lower area of the fuel assembly by arranging the fuel rods including the burnable poison such as gadlinium, so-called gadlinium fuel rod. The gadlinium fuel rod has in its nature a generated power lower than that of the fuel rod not including the burnable poison and the initial local power peaking factor of the gadlinium fuel rod is about 0.4.

When the fuel assembly is designed such that the fuel rods, to be charged into the fuel assembly 10A, including the burnable poison is constructed as fuel rods G2 and the lower area of the gadlinium fuel rod is composed of the natural uranium, the local power peaking factor is lowered to a value of about 0.2. On the contrary, when the fuel enrichment of the uranium fuel rod including no burnable poison is lowered to a value corresponding to that of the natural uranium, the local power peaking factor of that fuel rod is lowered to a value of about 1.0 to 0.5.

The lowering amount of the power per one fuel rod is about 0.2 in the case of the gadlinium fuel rod, and that of the uranium fuel rod is about 0.5. Since the power lowering amount is to be compensated for by the other fuel rods, the maximum value of the local power peaking factor as the entire fuel assembly further increases.

However, the increasing of the local power peaking factor can be suppressed minimally by arranging the gadlinium fuel rods having less power lowering amount per one fuel rod, which results in an advantage of lowering the maximum linear power density at the power operation period.

On the basis of the above two reasons, the second fuel rods 12b are designed as the gadlinium fuel rods. Futher, in a power range in which the maximum linear power density is allowable at the reactor operation period, the second fuel rods 12b are not necessarily composed of gadlinium and the gadlinium fuel rods may be substituted by other fuel rods arranged at the central portion of the fuel assembly 10A. In this case, the fuel economy due to the increasing of the infinite multiplication factor at the lower area of the fuel assembly will be improved.

Figure 8:
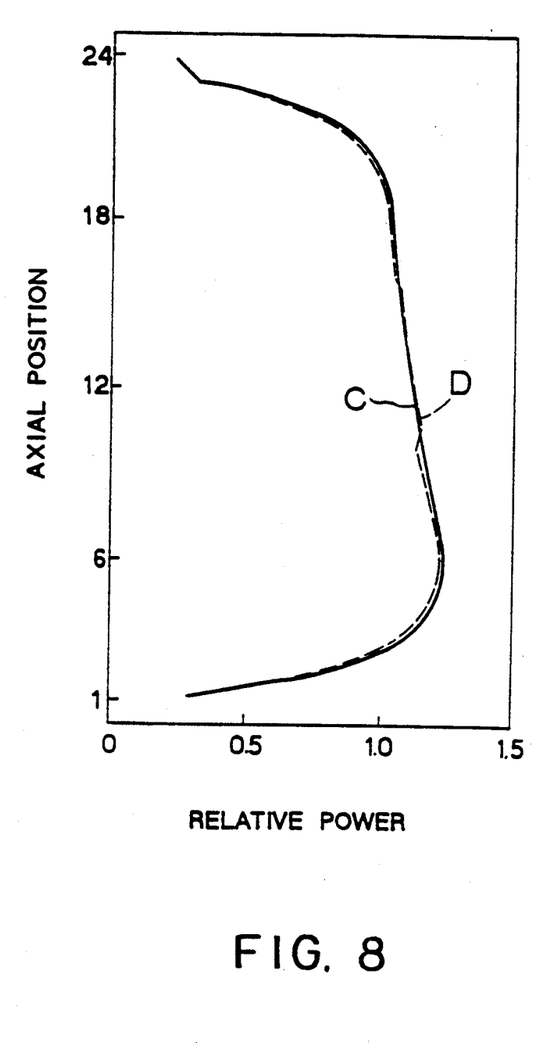
FIG. 8 is a graph showing a comparison of the axial power distribution at the power operation period of the fuel assembly of FIG. 6 with that of FIG. 9.

FIG. 8 shows the axial power distribution at the power operation period of the reactor in which the fuel assemblies 10A are as shown in FIGS. 6 and 7. As can be seen from FIG. 8, the average fuel enrichment of the upper area of the fuel assembly 10A is made higher than that of the lower area thereof, and the lower area includes the burnable poison of the amount larger than that included in the upper area, so that the axial power distribution is sufficiently flat as shown in the solid line C.

Figure 9:
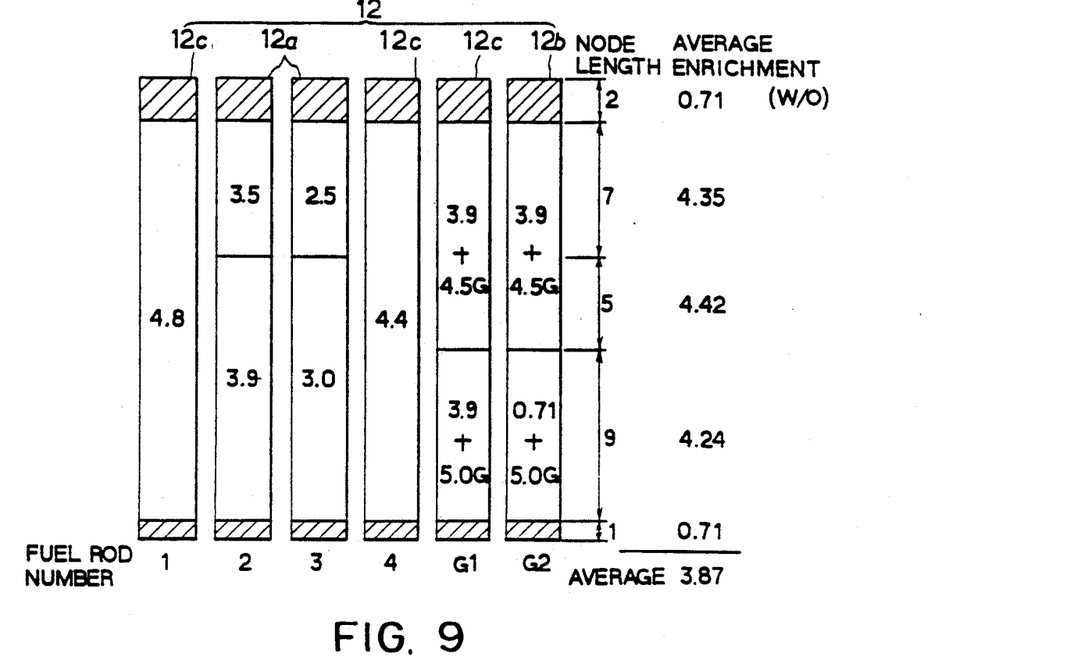
FIG. 9 is a view similar to FIG. 7, corresponding to the fuel assembly of the third embodiment of the present invention.

FIG. 9 shows the third embodiment of the fuel assembly according to the present invention as a view similar to FIG. 7. The fuel assembly of this embodiment is represented in FIG. 9 as a fuel assembly 10B which is adapted for achieving the high burning performance like the fuel assembly 10A shown in FIGS. 6 and 7. The arrangement of the fuel rods accommodated in the channel box 11 of the fuel assembly 10B is substantially the same as that of FIG. 6, so that a figure showing such arrangement is omitted herein. FIG. 9 shows the axial fuel enrichment distributions and the gadlinium as burnable poison, distributions of the respective fuel rods of the fuel assembly 10B. The fuel assembly 10B differs from the fuel assembly 10A in that the boundaries between the upper areas and the lower areas of the first fuel rods 12a of the numbers of 2 and 3 are positioned at levels higher than that of the second fuel rod 12b of the number of G2.

Namely, in the fuel assembly 10B, the boundary between the upper and power areas of the second fuel rod 12b exists within a range of 7/24 to 6/24 length of the axial entire length of the fuel effective length from the lower end of the fuel effective length, and the boundary of the first fuel rod 12a is positioned at the level higher than that of the second fuel rod 12b, whereby the interior of the fuel assembly 10B is divided into three areas including upper, central and lower areas. In such arrangement, according to this embodiment, the average fuel enrichment of the upper and lower areas is made smaller than that of the central area, and the content in amount of the burnable poison in the lower area is made larger than that in the central area. The content in amount of the burnable poison in the upper area is made equal to or less than that of the central area. The lower area of the second fuel rod including the burnable poison is formed by adding a burnable poison into a natural uranium or waste uranium disposed during an enriching process.

The reason why the axial areas of the fuel assembly 10B are divided into three areas by changing the levels of the boundaries in the first and second fuel rods 12a and 12b resides in the evaluation of the fuel enthalpy at the reactivity insertion event, which is based on the fact that an area required for lowering the local power peaking factor at the low temperature operation period may be ranged minimally within 15/24 to 22/22 length portion from the lower end of the fuel effective length. In the case of the fuel assembly 10B of the third embodiment, the fuel enthalpy in the assumption of the control rod fall-down accident is substantially the same as that of the fuel assembly 10A shown in FIGS. 6 and 7, being 226 cal/gUO$_2$, which satisfies the limited value of 230 cal/gUO$_2$.

In the case of the fuel assembly 10B shown in FIG. 9, in which the boundaries between the upper and lower areas of the first and second fuel rods 12a and 12b are warped to provide the three axial areas, but the power distribution, shown by the broken line D in FIG. 8, has substantially no difference from the case of the fuel assembly 10A of the second embodiment, thus the line D being almost flat as in the line C. Accordingly, there is no problem in the reactor running performance. In the fuel assembly including three axial areas, the power at the upper area is relatively lowered with respect to the central area, and as a result, the neutron leakage from the upper area reduces, thus contributing to the fuel economy.

Figure 10:
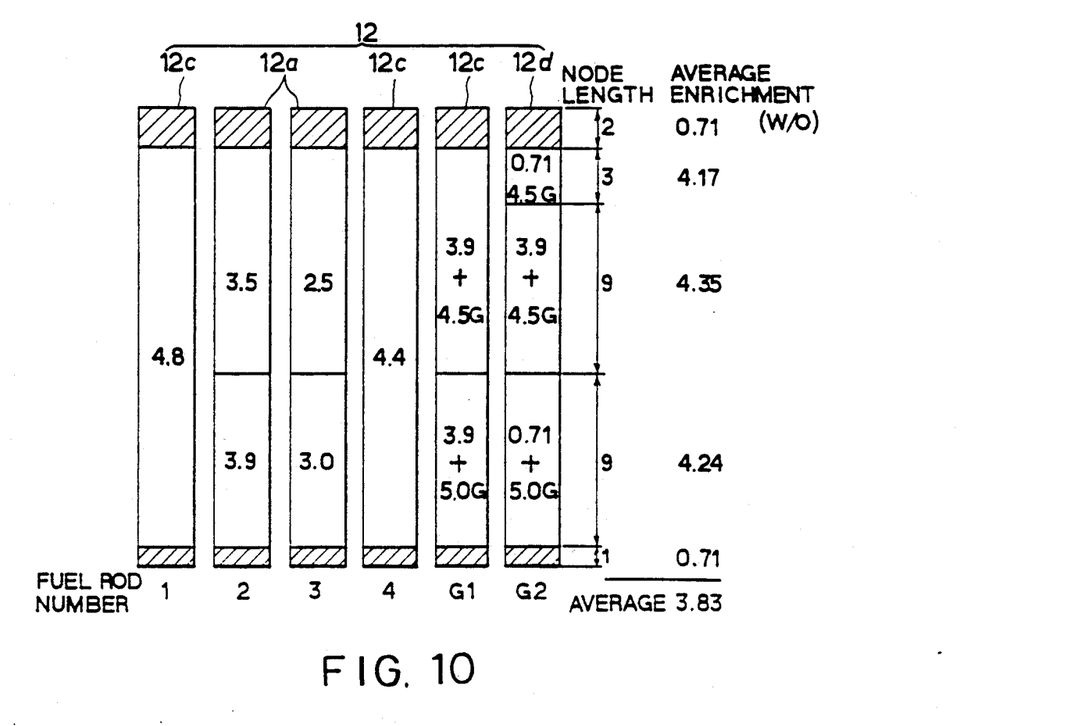
FIG. 10 is a view similar to FIG. 9, corresponding to the fuel assembly of the fourth embodiment of the present invention.

FIG. 10 is a graph similar to that of FIG. 7 or 9, represnting a fuel assembly according to the fourth embodiment of the present invention.

The fuel assembly 10C of this embodiment is one also adapted for achieving the high burning performance as in the fuel assembly 10A of FIG. 6, and the fuel assembly 10C has substantially the same fuel rod arrangement as that of the fuel assembly 10A shown in FIG. 6. FIG. 10 shows the axial fuel enrichment distributions and the gadlinium distributions of the fuel rods 12 accommodated in the fuel assembly 10C. The difference of the fuel assembly 10C from that 10A of the second embodiment resides in that an area is additionaly provided below the upper area, composed of the natural uranium of the fuel rod of number of G2, having an axial length of about 12 inches corresponding to two nodes, this area having the axial length of about 18 inches corresponding to three nodes, for example, and being formed of natural uranium (enrichment 0.71 w/o), which is lower than that of the further lower area. This fuel rod G2 is regarded as the fourth fuel rod 12d having an upper area of the length about 12 to 24 inches in which the fuel enrichment is lowered.

In this embodiment, the fourth fuel rod 12d is formed as an improved one of the second fuel rod 12b, but it is not necessary to form this fourth fuel rod 12d in combination with the second fuel rod 12b and the fuel rod 12d may be combined with the other fuel rod such as third fuel rod 12c to thereby reduce the fuel enrichment of the upper area of the fuel assembly 10C.

According to the specific arrangement of the fuel assembly 10C of the fourth embodiment, not only the fuel enthalpy at the reactivity initiated accident is made low, but also the reactor shutdown margin can be improved. In the reactor core shown in FIG. 3, since the axial power distribution at the low temperature operation period is made large in the upper area having an axial length of about 12 to 24 inches, the reactor shutdown margin can be improved by lowering the fuel enrichment in this upper area. The improvement of the reactor shutdown margin will make it possible to further reduce the gadlinium amount to be included in that upper area. The reduction of the gadlinium amount results in the reduction of the amount of the cinder of the gadlinium, thus effectively reducing the reactivity loss and hence improving the fuel economy.

Figure 11A:
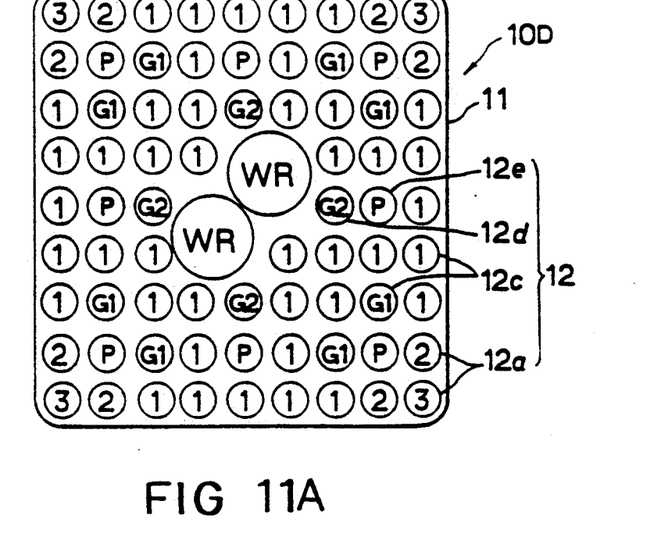
FIGS. 11A and 11B have a view similar to FIG. 10, corresponding to the fuel assembly of the fifth embodiment of the present invention.
Figure 11B:
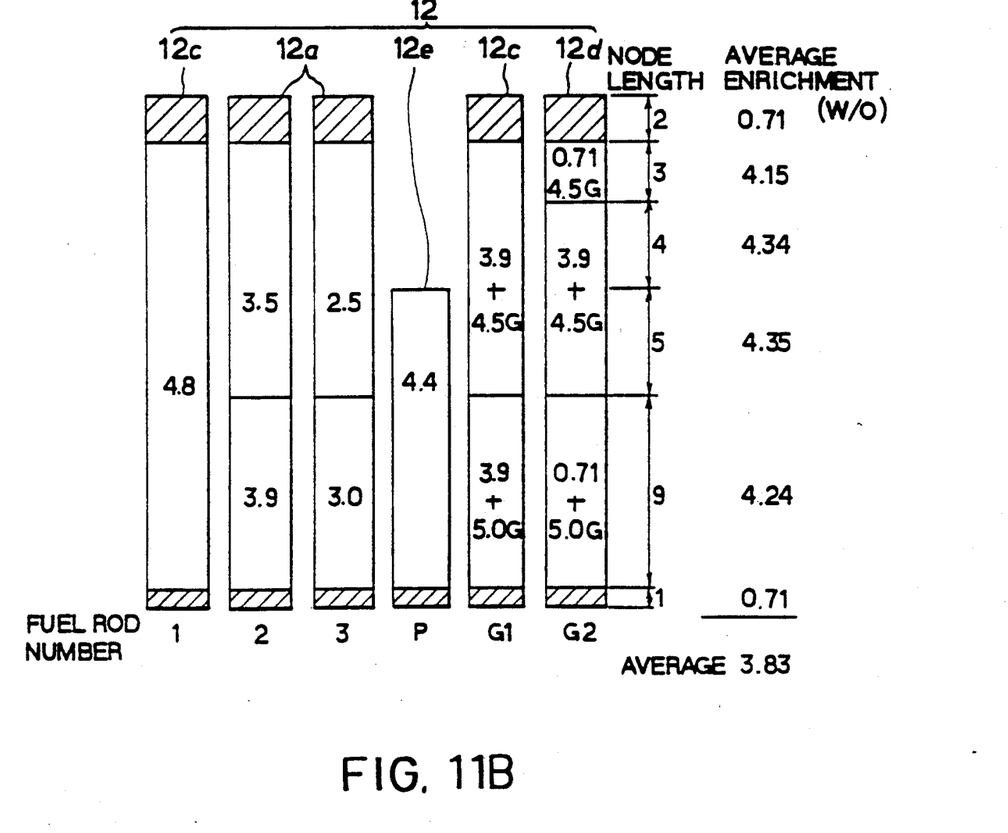

FIG. 11 represents the fifth embodiment of the fuel assembly according to the present invention.

Referring to FIG. 11, the fuel assembly 10D of this embodiment is also composed of the channel box 11 in which the fuel rods 12 are arranged in the square lattice form of 9 rows and 9 columns. This fuel assembly 10D contains fuel rods 12e designated P having an axial length shorter than that of the other fuel rod 12, this fuel rod 12e being called a short fuel rod 12e hereinlater.

The short fuel rod 12e has an upper axial cut-off portion having the length of about 1/3 of the fuel effective length to reduce the pressure loss.

The fuel assembly 10D of the structure described above has characteristic phenomenon such that the local power peaking factor of the fuel rods 12 arranged near the four corner portions of the channel box 11 at the low temperature operation period is made extremely large. In order to prevent this phenomenon, it is effective to design the fuel assembly 10D in the form shown in FIG. 11, in which the maximum value of the local power peaking factor at the upper area of the fuel assembly 10D at the low temperature operation period is about 1.35 and the fuel enthalpy in the assumption of the control rod fall-down accident is 227 cal/gUO$_2$. Further, when the fuel assembly 10D is designed such that the first fuel rods 12a are not arranged near the corner portions of the fuel assembly 10D and the fuel enrichment is made large in the upper portion as made in the conventional fuel assembly, the local power peaking factor at the low temperature operation period is about 1.6, which hence exceeds the limited value of the fuel enthalpy.

In this embodiment, the first fuel rods 12a are arranged only at portions near the four corner portions of the channel box 11, but the fuel assembly 10D containing the short fuel rods 12e has a tendency that the local power peaking factor at the low temperature operation period of the fuel rods, adjoining to the short fuel rods 12e and arranged centrally on the side of the channel box 11, is made large. For this reason, the local power peaking factor at the low temperature operation period can be further made small by substituting these fuel rods with the first fuel rods 12a.

In the foregoing description of the respective embodiments of the fuel assemblies according to the present invention, the embodiments include the first and second fuel rods 12a and 12b accommodated in the channel box. The setting of the boundary positions in the axial areas of these first and second fuel rods 12a and 12b will be explained hereunder.

First, the boundary position of the axial areas of the second fuel rod 12b is decided in the viewpoint of making flat the axial power distribution at the reactor power operation period. The peak position of the axial power during the power operation period is easily generated at a portion lower than a portion in a range of 7/24 to 16/24 length of the axially entire length of the fuel effective length, so that it is desired to set the boundary position of the second fuel rod 12b within this range.

Next, the boundary position of the axial areas of the first fuel rod 12a is decided in relation to the shape of the axial power distribution at the low temperature operation period. The peak position of the axial power distribution at the low temperature operation period exists above a range of 12/24 length of the axially entire length of the fuel effective length, so that it is desired to set the boundary position of the first fuel rod 12a minimally above the range of the 12/24 length of the fuel rod 12a. However, for easy manufacturing of the fuel rod and the simple design thereof, there is substantially no problem in setting the boundary position of the first fuel rod 12a to the same level as that of the second fuel rod 12b.

In the foregoing embodiments, the concentration of the gadlinium as the burnable poison is made relatively larger in the lower area of the fuel assembly than that in the upper area thereof, but the present invention is not limited to such embodiments, but it may be possible to make uniform the concentration of the gadlinium in the axial areas of the entire fuel assembly. In the embodiment in which the second fuel rod is formed as the gadlinium fuel rod, the lower area is formed of the natural uranium, but the present invention is not limited to such embodiment.

Furthermore, in the embodiments of the fuel assemblies which are designed for achieving the high burning performance, two water rods are arranged centrally of the fuel rod arrangement, but it may be possible to arrange, at the central portion, one large water rod such as having a cross sectional area corresponding to total areas of nine fuel rods. In such a modified embodiment, substantially the same effects as described above may be achieved.

What is claimed is:

1. A fuel assembly to be charged in a reactor core comprising:

a channel box extending vertically in the core and having a substantially square cross section;

a number of fuel rods arranged in the channel box in the form of a lattice in cross sections thereof, said fuel rods extending vertically in the channel box with spaces with each other;

a spacer means for supporting the fuel rods in the channel box so as to maintain axial spaces between the fuel rods; and upper and lower tie plates for supporting upper and lower end portions of the fuel rods;

wherein the fuel rods include first type fuel rods arranged at and near four corner portions of the channel box, each of said first type fuel rods being composed of upper and lower areas, except for extreme upper and lower ends, in which a fuel enrichment of the upper area is made lower than that of the lower area.

2. A fuel assembly according to claim 1, wherein said fuel rod are arranged in a square lattice of a plurality of rows and columns in cross sections thereof.

3. A fuel assembly according to claim 2, wherein said fuel rods are arranged in the lattice form of 8 rows and 8 columns in cross sections thereof and at least one water rod is arranged centrally in the lattice form, said water rod has a cross sectional area larger than that of one of other fuel rods.

4. A fuel assembly to be charged in a reactor core comprising:

a channel box extending vertically in the core and having a substantially square cross section;

a number of fuel rods arranged in the channel box in the form of a lattice in cross sections thereof, said fuel rods extending vertically in the channel box with spaces with each other;

a spacer means for supporting the fuel rods in the channel box so as to maintain axial spaces between the fuel rods; and upper and lower tie plates for supporting upper and lower end portions of the fuel rods;

wherein the fuel rods include first type fuel rods arranged at and near four corner portions of the channel box, each of said first type fuel rods being composed of upper and lower areas, except for extreme upper and lower ends, in which a fuel enrichment of the upper area is made lower than that of the lower area and also include other type fuel rods being arranged at portions other than the first type fuel rods and including second type fuel rods, each of said second type fuel rods being composed of upper and lower areas, except for extreme upper and lower ends, in which a fuel enrichment of the upper area is made higher than that of the lower area.

5. A fuel assembly according to claim 4, wherein said fuel rod are arranged in a square lattice of a plurality of rows and columns in cross sections thereof.

6. A fuel assembly according to claim 5, wherein said fuel rods are arranged in the lattice form of 9 rows and 9 columns in cross sections thereof and two water rods are arranged centrally in the lattice form, each of said water rod having a cross sectional area larger than that of one of other fuel rods.

7. A fuel assembly according to claim 4, wherein the upper and lower areas of the first and second type fuel rods are divided by first and second boundary portions, respectively, the first and second boundary portions being positioned at substantially the same level with each other so as to design the upper areas of the fuel assembly having an average fuel enrichment larger than that of the lower areas thereof.

8. A fuel assembly according to claim 4, wherein the upper and lower areas of the first and second type fuel rods are divided by first and second boundary portions, respectively, the first boundary portions of the first type fuel rods being positioned at levels higher than the second boundary portions of the second type fuel rods so that the fuel assembly is axially divided into upper, intermediate and lower areas, wherein average fuel enrichments in the upper and lower area are made lower than an average fuel enrichment of the intermediate area.

9. A fuel assembly according to claim 4, wherein said second type fuel rods contain a burnable poison.

10. A fuel assembly according to claim 9, wherein the burnable poison comprises gadlinium.

11. A fuel assembly according to claim 4, wherein the other fuel rods further include third type fuel rods each having an axially equal fuel enrichment distribution.

12. A fuel assembly according to claim 4, wherein the other fuel rods further include third type fuel rods each having an axial section divided into upper, intermediate and lower areas, in which the fuel enrichments in the upper and lower areas are made lower than that of the intermediate area.

13. A fuel assembly according to claim 12, wherein the other fuel rods further include at least one fourth type fuel rod having an axial length shorter than the lengths of said first, second and third fuel rods.

14. A fuel assembly according to claim 13, wherein said at least one fourth type fuel rod has an axially upper portion cut off by a length of about one third of a fuel effective length.

15. A fuel assembly according to claim 14, further comprising centrally arranged water rods in the lattice arrangement and wherein said at least one fourth type fuel rod is arranged between the first type fuel rods and the centrally arranged water rods.

* * * * *